(12) United States Patent
Christman et al.

(10) Patent No.: US 8,328,682 B2
(45) Date of Patent: Dec. 11, 2012

(54) SYSTEM AND METHOD FOR CONTROLLING AMOUNT OF TIME NEEDED TO COMMENCE TRANSMITTING ENGINE TORQUE IN A VEHICLE

(75) Inventors: Anthony Christman, Madison Heights, MI (US); Shaochun Ye, Wixom, MI (US); Michael D. Haggerty, Sterling Heights, MI (US); R. Travis Schwenke, Springboro, OH (US); Allen J. Lehmen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 12/881,256

(22) Filed: Sep. 14, 2010

(65) Prior Publication Data
US 2012/0065023 A1 Mar. 15, 2012

(51) Int. Cl.
*B60W 10/08* (2006.01)
(52) U.S. Cl. .......................................................... 477/5
(58) Field of Classification Search ........................ None
See application file for complete search history.

(56) References Cited

U.S. PATENT DOCUMENTS

| | | | |
|---|---|---|---|
| 6,524,219 B2* | 2/2003 | Mesiti et al. | 477/5 |
| 7,360,616 B2* | 4/2008 | Schiele | 180/65.265 |
| 7,722,499 B2* | 5/2010 | Soliman et al. | 477/5 |
| 7,874,956 B2* | 1/2011 | Kouno | 477/5 |
| 7,878,281 B2* | 2/2011 | Tanishima | 180/65.265 |
| 7,975,791 B2* | 7/2011 | Nozaki et al. | 180/65.6 |
| 8,147,375 B2* | 4/2012 | Sah | 477/5 |
| 8,241,176 B2* | 8/2012 | Soliman et al. | 477/21 |
| 2006/0089235 A1* | 4/2006 | Kobayashi | 477/107 |

* cited by examiner

*Primary Examiner* — Dirk Wright
(74) *Attorney, Agent, or Firm* — Quinn Law Group, PLLC

(57) ABSTRACT

A method controls an amount of time required to commence transmitting torque of an internal combustion engine equipped with a stop/start feature to a transmission configured to transmit the torque of the engine to drive-wheels in a vehicle. The method includes determining whether a start of the engine is likely. The method also includes pre-filling with fluid a hydraulically-actuated clutch that is configured to connect the engine to the transmission when the start of the engine is likely. Accordingly, the amount of time required to commence transmitting torque of the engine to the transmission is reduced. A system employs the method for controlling an amount of time required to commence transmitting torque of the engine.

20 Claims, 2 Drawing Sheets

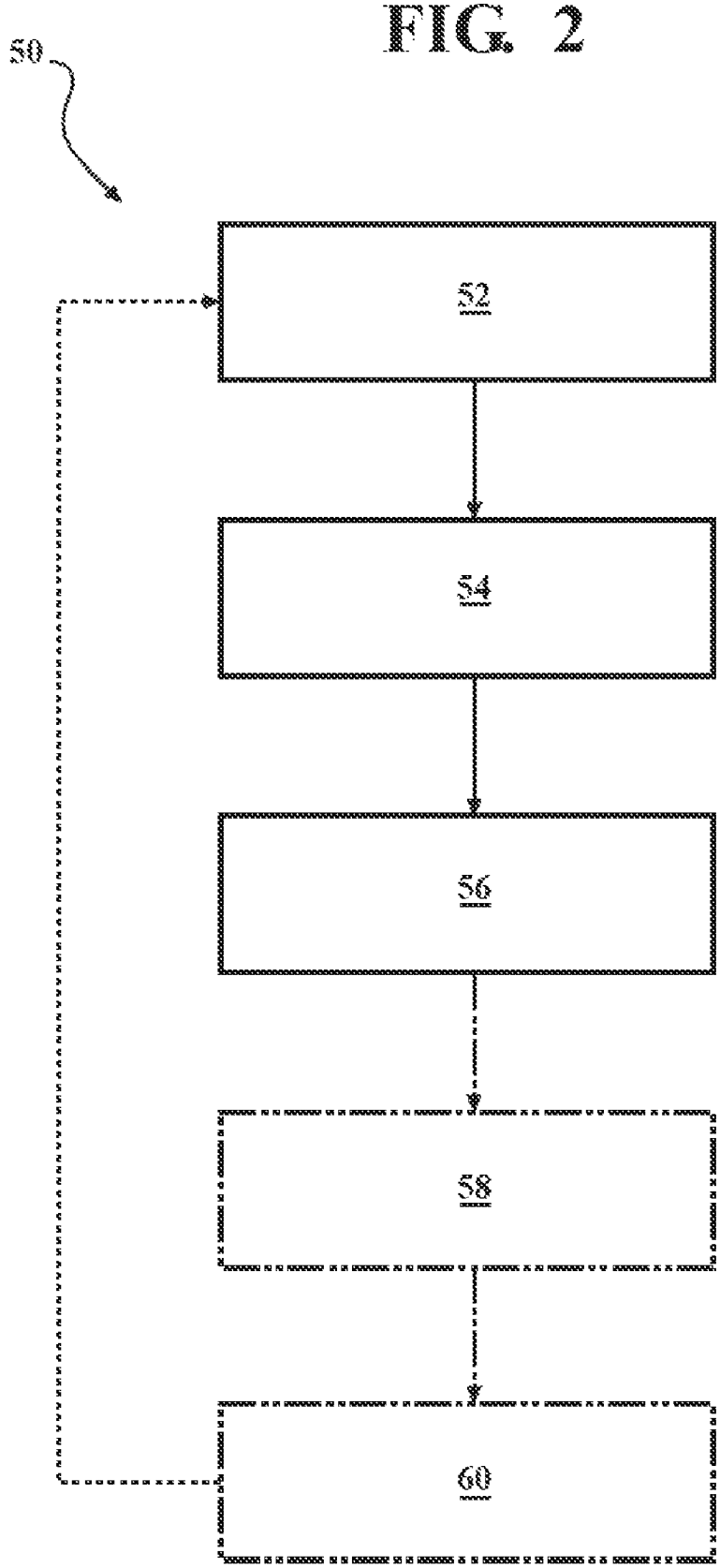

SYSTEM AND METHOD FOR CONTROLLING AMOUNT OF TIME NEEDED TO COMMENCE TRANSMITTING ENGINE TORQUE IN A VEHICLE

TECHNICAL FIELD

The invention relates to a system and a method for controlling an amount of time needed to commence transmitting torque of an engine in a vehicle.

BACKGROUND

A majority of modern vehicles employ internal combustion engines for propulsion. In search of reduced exhaust emissions, as well as for improved fuel efficiency, some vehicles employ electric motor/generators that combine with an internal combustion engine and a transmission to form a hybrid powertrain. Also for reduced exhaust emissions and improved fuel efficiency, some vehicles incorporate internal combustion engines with stop/start capability.

Stop/start capability allows the engine to be automatically shut off when the vehicle comes to a stop, and to be automatically restarted when the vehicle operator releases the subject vehicle's brake pedal. Generally, stop/start capability reduces the engine's emissions and improves the vehicle's overall fuel efficiency since the engine does not consume fuel or produce post-combustion exhaust when the vehicle is stopped.

As employed in any of the above powertrains, an internal combustion engine is often used to drive an alternator that is configured to produce electric power for running various vehicle accessories and sub-systems, as well as for charging an on-board energy-storage device. In an engine having a stop/start capability, an alternator/motor may be specifically designed to quickly restart an engine that has been shut off, when vehicle motion is again desired.

When such an engine is restarted, it may take time for the subject powertrain to commence transmitting engine torque to the vehicle's drive wheels, thus generating a delay between an instant when a request for vehicle drive is made and when the engine torque is actually applied at the wheels.

SUMMARY

A method is provided for controlling an amount of time required to commence transmitting torque of an internal combustion engine equipped with a stop/start feature to a transmission configured to transmit the torque of the engine to drive-wheels in a vehicle. The method includes determining whether a start of the engine is likely, i.e., is anticipated or expected imminently. The method also includes pre-filling with fluid a hydraulically-actuated clutch that is configured to connect the engine to the transmission when the start of the engine is likely, i.e., prior to the actual start of the engine. Accordingly, the amount of time required to commence transmitting torque of the engine to the transmission is reduced.

When the start of the engine is likely, the method may also include pre-filling a hydraulically-actuated damper with fluid. The damper may be operatively connected to each of the engine and the transmission, and configured to preclude at least some vibrations of the engine from being transmitted to the transmission.

According to the method, each of the acts of determining whether the start of the engine is likely and pre-filling with fluid the clutch and damper may be accomplished by a controller arranged in the vehicle.

Whether the start of the engine is likely may be established by initially determining a maximum amount of torque input available from a motor/generator operatively connected to the transmission. Establishing whether the engine start is likely may then be accomplished by determining a requested amount of torque output from the transmission, and accessing a predetermined offset torque value. Furthermore, establishing whether the engine start is likely may then be accomplished by determining a threshold torque value, wherein the threshold torque value is the difference between the maximum amount of torque input and the offset torque value, and comparing the threshold torque value and the requested amount of torque output from the transmission. Accordingly, the determination may be made that the start of the engine is likely when the requested level of torque output is greater than the threshold torque value.

The act of determining a requested amount of torque output from the transmission may be accomplished using data indicative of a position of a device in operative communication with the controller and configured to be actuated by an operator of the vehicle, such as an accelerator pedal. The act of accessing the offset torque value may be accomplished by the controller from a table containing the offset torque value. The table may be programmed into the controller.

The controller may additionally be programmed with a predetermined torque quotient. Accordingly, when the pre-filling of the clutch and damper is commenced, the pre-filling may be aborted if the requested level of torque output drops below the threshold torque value by an amount greater than the predetermined torque quotient.

The method may additionally include determining the maximum amount of torque input using data indicative of at least one of a speed and a temperature data of the motor/generator.

A system employing the method for controlling an amount of time required to commence transmitting torque of the engine is also provided.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 2 is a flow chart illustrating a method for controlling an amount of time required to commence transmitting torque of an internal combustion engine in the hybrid electric vehicle depicted in FIG. 1.

DETAILED DESCRIPTION

Figure 1:
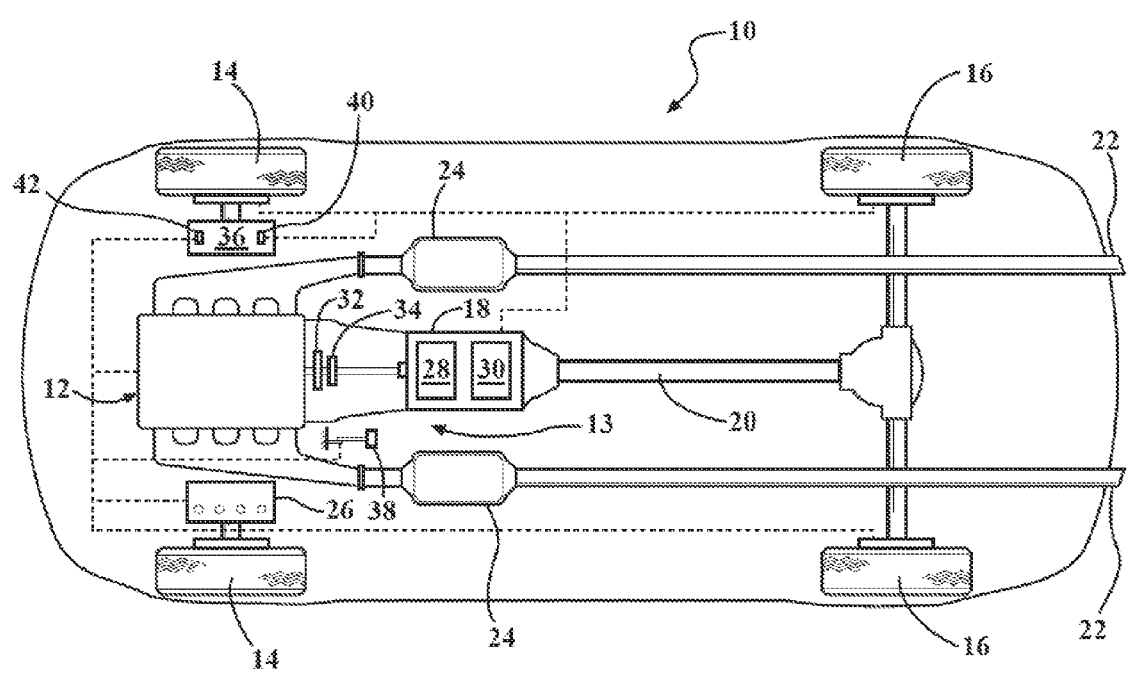
FIG. 1 is a schematic plan view of a hybrid electric vehicle employing an internal combustion engine with a stop/start feature.

Referring to the drawings, wherein like reference numbers refer to like components, FIG. 1 shows a schematic view of a hybrid electric vehicle (HEV) 10. The HEV 10 incorporates an internal combustion engine 12, such as a spark or a compression ignition type engine, adapted to provide torque to drive-wheels 14 and/or wheels 16 to thereby propel the vehicle. Engine 12 includes a stop/start capability or feature that allows the engine to be automatically shut off when engine torque is not required to propel HEV 10 and then be automatically restarted when the engine torque is again desired.

Stop/start capability of engine 12 reduces the overall emissions of HEV 10 and improves the vehicle's fuel efficiency since the engine does not consume fuel or produce post-combustion exhaust when the vehicle is stopped. HEV 10 also includes a system 13 for controlling an amount of time required to commence transmitting torque of engine 12 after the engine has been restarted. System 13 includes a transmission 18 operatively connected to engine 12 and, when the engine is running, configured to transmit the torque of the engine to drive-wheels 14 and/or 16 via a drive or a propeller shaft 20.

The engine 12 emits gases that are a product of the combustion process via an exhaust system 22 to the ambient. The exhaust system 22 includes catalytic converters 24 that are employed to reduce toxicity of the emitted exhaust gases, i.e., exhaust emissions, prior to the gases entering the atmosphere, as understood by those skilled in the art. Engine 12 includes internal components such as a camshaft, crankshaft, reciprocating pistons, and connecting rods, none of which are shown, but the presence of which will be appreciated by those skilled in the art. The pistons transfer the force of combustion to the crankshaft and thereby rotate engine 12.

Although vehicle 10 is shown as a hybrid electric type of a vehicle, a non-hybrid vehicle having engine 12 with a stop/start capability is also envisioned. Engine 12 may also be employed for engine braking, i.e., using the inertia of the HEV 10 to rotate the engine, thereby slowing the vehicle when the HEV is coasting down from elevated speed. Furthermore, engine 12 may be configured to receive energy from and supply energy to an energy-storage device 26, such as one or more batteries.

HEV 10 additionally incorporates motor-generators 28 and 30. Motor-generators 28 and 30 are configured to receive energy from and supply energy to energy-storage device 26 and may be configured to retard HEV 10 via the regenerative braking. As shown, motor-generators 28 and 30 are positioned within the transmission 18, but may also be positioned anywhere in the HEV 10, depending on the vehicle architecture and control of the power flow. The HEV 10 is capable of being propelled by the motor-generators 28, 30 alone, or in combination with the engine 12. Although two motor-generators, 28 and 30, are shown, depending on the actual configuration of the HEV 10, only a single motor-generator may be employed within the powertrain of a subject vehicle.

Generally, an HEV utilizing an engine and two motor-generators may connect the engine and the motor-generators to a transmission such that torque and speed of the engine may be selected independently of vehicle speed and desired acceleration. Such control of the engine is typically achieved by varying individual torque contribution from the two motor-generators. Thus, an HEV utilizing an engine in combination with two motor-generators may obtain suitable torque contribution from each of the engine and the two motor-generators and realize improved overall vehicle efficiency.

Energy-storage device 26 supplies electrical energy to power the engine 12, the motor-generators 28, 30, and other miscellaneous vehicle accessories, such as vehicle heating and ventilation system, and exterior and interior lighting. Energy-storage device 26 is configured to selectively store energy up to a maximum allowable state of charge (SOC), and release the stored energy down to a predetermined minimum SOC. The predetermined minimum SOC of energy-storage device 26 is a low state of charge below which the energy-storage device may be incapable of providing sufficient electrical current to drive the motor-generators 28, 30. The predetermined minimum SOC of energy-storage device 26 may be influenced by a variety of factors, such as, the ambient temperature being too low, or a fault within the energy-storage device, as understood by those skilled in the art. A fault may be generated within the energy-storage device 26, if, for example, the internal temperature of the energy-storage device increases above a specific operating limit, such as due to a recently interrupted quick charging cycle.

System 13 also includes a hydraulically-actuated clutch 32 configured to selectively connect and disconnect engine 12 and transmission 18. A pressurized fluid for actuating clutch 32 may be provided by a fluid pressure source, such as an oil pump (not shown) generally employed to generate fluid pressure for operating transmission 18. The filling of clutch 32 with fluid couples engine 12 with transmission 18 in order to transmit torque of the engine to charge storage device 26 and assist with propelling HEV 10.

System 13 may additionally include a hydraulically-actuated damper 34. As shown, damper 34 is operatively connected to each of the engine 12 and the transmission 18 and is configured to damp or filter vibrations of the engine, i.e., to preclude at least some vibrations of the engine from being communicated to the transmission. As employed herein, damper 34 is a spring-mass type of a system that is configured to smooth out operation of engine 12 and facilitate delivery of steady flow of torque to transmission 18. As generally is the case with any spring-mass type of a system, damper 34 is characterized by a resonance frequency, which in the case of the damper, although occurring below the operating range of engine 12, gets traversed during an engine start. Therefore, during a start of engine 12, damper 34 is filled with fluid and is thereby locked to form a solid structure such that the torque of engine 12 passes through damper 34 without disturbing the spring-mass system and invoking the resonance.

Typically, the filling of clutch 32 and damper 34 with fluid takes time, which may result in additional time for the subject powertrain to commence transmitting engine torque to the vehicle's drive wheels. Consequently, a time delay may result between an instant when a request for vehicle drive is made and when the torque of engine 12 is actually applied at drive-wheels 14 and/or 16.

HEV 10 also includes a controller 36 adapted to regulate the operation of engine 12, motor-generators 28 and 30, transmission 18, clutch 32 and damper 34. Controller 36 is configured to monitor the SOC of energy-storage device 26. Controller 36 is also configured to determine whether a start or a restart of engine 12 is likely or is expected imminently. Additionally, controller 36 is operable for pre-filling clutch 32 and damper 34 with fluid when such a start is likely, but prior to the generation of an actual request to start the engine. Such pre-filling of clutch 32 and damper 34 before the engine 12 is started is beneficial in order to reduce the amount of time required to commence transmitting torque of engine 12 to transmission 18.

Controller 36 may establish that a start of engine 12 is likely by initially determining a maximum amount of torque input available solely from motor/generators 28, 30 being powered by energy-storage device 26, i.e., electric-only torque without assist from engine 12. Such maximum amount of torque input available from motor/generators 28, 30 may be determined using data developed during testing, calibration, and development of the motor/generators and HEV 10. Generally, the maximum amount of torque input available solely from motor/generators 28, 30 is likely to be indicative of at least one of an operating speed and a temperature of the motor/generators, SOC of energy-storage device 26, as well as other factors. Following the establishing of the maximum amount of torque input available, controller 36 may determine a requested amount of torque output from the transmission. The requested amount of torque output from the transmission is typically signaled by a device 38 that is in operative communication with controller 36. Data indicative of a position of device 38 may be used to select or identify the requested amount of torque output from transmission 18. Device 38 may be an accelerator pedal that is configured to be actuated by an operator of HEV 10.

In order to establish that a start of engine 12 is likely, controller 36 may subsequently access a predetermined offset torque value from a table 40. Table 40 may be programmed into the controller 36 and contain discrete offset torque values, wherein the offset torque is a function of speed of HEV 10. The predetermined offset torque value is an amount of torque output available from motor/generators 28, 30 at a specific speed of HEV 10 and at the instant when a restart of engine 12 is expected to occur. The discrete offset torque values are generally predetermined during a calibration phase of motor/generators 28, 30 and in the course of testing of HEV 10 in order to account for various operating conditions of the HEV. Furthermore, in order to establish whether the engine start is likely, a threshold torque value that is the difference between the maximum amount of torque input available from motor/generators 28, 30 and the offset torque value may then be determined. The threshold torque value and the requested amount of torque output from the transmission may then be compared. Based upon such a comparison, the controller will establish that the start of the engine is likely when the requested amount of torque output from the transmission is greater than the threshold torque value. Thus, the threshold torque value is representative of an amount of torque that, if exceeded by actual requested amount of torque output from transmission 18, generates the pre-filling of clutch 32 and damper 34.

Controller 36 may also be operable for aborting the pre-filling of clutch 32 and damper 34. In order to facilitate a determination whether the pre-filling of clutch 32 and damper 34 should be aborted, controller 36 may additionally be programmed with a predetermined torque quotient 42. Predetermined torque quotient 42 is a particular amount of torque that is intended to account for fluctuations in the requested level of torque as signaled by device 38, and to prevent an unwanted cycling of pre-filling and ceasing to fill clutch 32 and damper 34 with fluid. Predetermined torque quotient 42 is generally established during the course of development and testing of HEV 10. Once controller 36 commences pre-filling the clutch 32 and the damper 34 with fluid, the pre-fill may be aborted if the requested level of torque output drops below the threshold torque value by greater than the predetermined torque quotient 42.

FIG. 2 depicts a method 50 for controlling an amount of time required to commence transmitting torque of engine 12 to transmission 18, as described above with respect to system 13 shown in FIG. 1. The method commences in frame 52 with HEV 10 either progressing down the road at a measurable velocity with engine 12 shut-off, or with the HEV stationary. The method then proceeds from frame 52 to frame 54 for determining by controller 36 whether a start of engine 12 is likely. Following frame 54, in frame 56 the method includes pre-filling with fluid clutch 32 in order to operatively connect engine 12 and transmission 18 when a start of the engine is established as being likely. As described above with respect to system 13, the pre-filling of clutch 32 is instrumental in reducing the amount of time required to commence transmitting torque of engine 10 to transmission 18.

As described above with respect to FIG. 1, the determination whether the start of engine 12 is likely may be established by initially determining a maximum amount of torque input available from motor/generators 28, 30. Additionally, establishing whether the start of engine 12 is likely is also facilitated by determining a requested amount of torque output from transmission 18, and accessing the predetermined offset torque value from table 40. Furthermore, establishing whether the start of engine 12 is likely may then be accomplished by determining the threshold torque value, wherein the threshold torque value is the difference between the maximum amount of torque input and the offset torque value. Following the determination of the threshold torque value, the threshold torque value and the requested amount of torque output from the transmission may be compared. A conclusion that the start of engine 12 is likely is formed when the requested level of torque output is determined to be greater than the threshold torque value.

Method 50 may also include pre-filling with fluid damper 34 by controller 36 in frame 58 when the start of engine 10 is determined as being likely. Method 50 may additionally include monitoring via controller 36 whether the requested level of torque output has dropped below the threshold torque value by an amount greater than the predetermined torque quotient 42 in frame 60.

If controller 36 determines that the requested level of torque output has dropped below the threshold torque value by an amount greater than the predetermined torque quotient 42, the pre-filling of clutch 32 and damper 34 will be aborted, otherwise the pre-filling of the clutch and damper will continue unrestricted. If in frame 60 it is determined that the requested level of torque output has dropped below the threshold torque value by an amount greater than the predetermined torque quotient 42 and the pre-filling gets aborted, the method may loop back to frame 52.

While the best modes for carrying out the invention have been described in detail, those familiar with the art to which this invention relates will recognize various alternative designs and embodiments for practicing the invention within the scope of the appended claims.

The invention claimed is:

1. A method for controlling an amount of time required to commence transmitting torque of an internal combustion engine equipped with a stop/start feature to a transmission configured to transmit the torque of the engine to drive-wheels in a vehicle, the method comprising:
   determining whether a start of the engine is likely; and
   pre-filling with fluid a hydraulically-actuated clutch configured to connect the engine to the transmission when the start of the engine is likely, such that the amount of time required to commence transmitting torque of the engine to the transmission is reduced.

2. The method of claim 1, further comprising pre-filling with fluid a hydraulically-actuated damper when the start of the engine is likely, wherein the damper is operatively connected to each of the engine and the transmission and configured to preclude at least some vibrations of the engine from being transmitted to the transmission.

3. The method of claim 2, wherein each of said determining whether the start of the engine is likely and pre-filling with fluid each of the clutch and damper is accomplished by a controller arranged in the vehicle.

4. The method of claim 3, wherein said determining whether the start of the engine is likely is accomplished by:
   determining a maximum amount of torque input available from a motor/generator operatively connected to the transmission;
   determining a requested amount of torque output from the transmission;
   accessing a predetermined offset torque value;

determining a threshold torque value, wherein the threshold torque value is the difference between the maximum amount of torque input and the offset torque value; and
comparing the threshold torque value and the requested amount of torque output from the transmission;
wherein the start of the engine is likely when the requested amount of torque output from the transmission is greater than the threshold torque value.

5. The method of claim 4, wherein said determining a requested amount of torque output from the transmission is accomplished using data indicative of a position of a device in operative communication with the controller and configured to be actuated by an operator of the vehicle.

6. The method of claim 4, wherein said accessing a predetermined offset torque value is accomplished by the controller from a table containing the offset torque value.

7. The method of claim 6, wherein the table is programmed into the controller.

8. The method of claim 4, wherein the controller is additionally programmed with a predetermined torque quotient and said pre-filling the clutch and the damper with fluid is aborted if the requested level of torque output drops below the threshold torque value by an amount greater than the predetermined torque quotient.

9. The method of claim 4, further comprising determining the maximum amount of torque input using data indicative of at least one of a speed and a temperature of the motor/generator.

10. A system for controlling an amount of time required to commence transmitting torque of an internal combustion engine equipped with a stop/start feature in a vehicle, the system comprising:
a transmission operatively connected to the engine and configured to transmit the torque of the engine to drive-wheels of the vehicle;
a hydraulically-actuated clutch configured to selectively connect and disconnect the engine and the transmission; and
a controller operable for:
determining that a start of the engine is likely; and
pre-filling the clutch with fluid when the start of the engine is likely, such that the amount of time required to commence transmitting torque of the engine to the transmission is reduced.

11. The system of claim 10, further comprising a damper operatively connected to each of the engine and the transmission and configured to preclude at least some vibrations of the engine from being transmitted to the transmission.

12. The system of claim 11, wherein the damper is hydraulically-actuated.

13. The system of claim 12, wherein the controller is additionally configured for pre-filling the damper with fluid when the start of the engine is likely.

14. The system of claim 10, further comprising a motor/generator operatively connected to the transmission.

15. The system of claim 13, wherein the controller determines that a start of the engine is likely by:
determining a maximum amount of torque input available from a motor/generator;
determining a requested amount of torque output from the transmission;
accessing a predetermined offset torque value;
determining a threshold torque value, wherein the threshold torque value is the difference between the maximum amount of torque input and the offset torque value; and
comparing the threshold torque value and the requested amount of torque output from the transmission;
wherein the start of the engine is likely when the requested amount of torque output from the transmission is greater than the threshold torque value.

16. The system of claim 15, further comprising a device in operative communication with the controller, wherein the device is configured to be actuated by an operator of the vehicle, and wherein data indicative of a position of the device is used to select the requested amount of torque output.

17. The system of claim 15, wherein the offset torque value is accessed by the controller from a table containing the offset torque value.

18. The system of claim 15, wherein the table is programmed into the controller.

19. The system of claim 15, wherein the controller is additionally programmed with a predetermined torque quotient, and is operative for aborting the pre-filling of the clutch and the damper if the requested level of torque output drops below the threshold torque value by an amount greater than the predetermined torque quotient.

20. The system of claim 15, wherein the maximum amount of torque input is determined using data indicative of at least one of a speed and a temperature of the motor/generator.

\* \* \* \* \*